Aug. 7, 1962  J. C. MELLINGER  3,048,027
AUTOMATIC DRY CONTROL FOR COMBINATION WASHER-DRIER
Filed Sept. 11, 1958  3 Sheets-Sheet 1
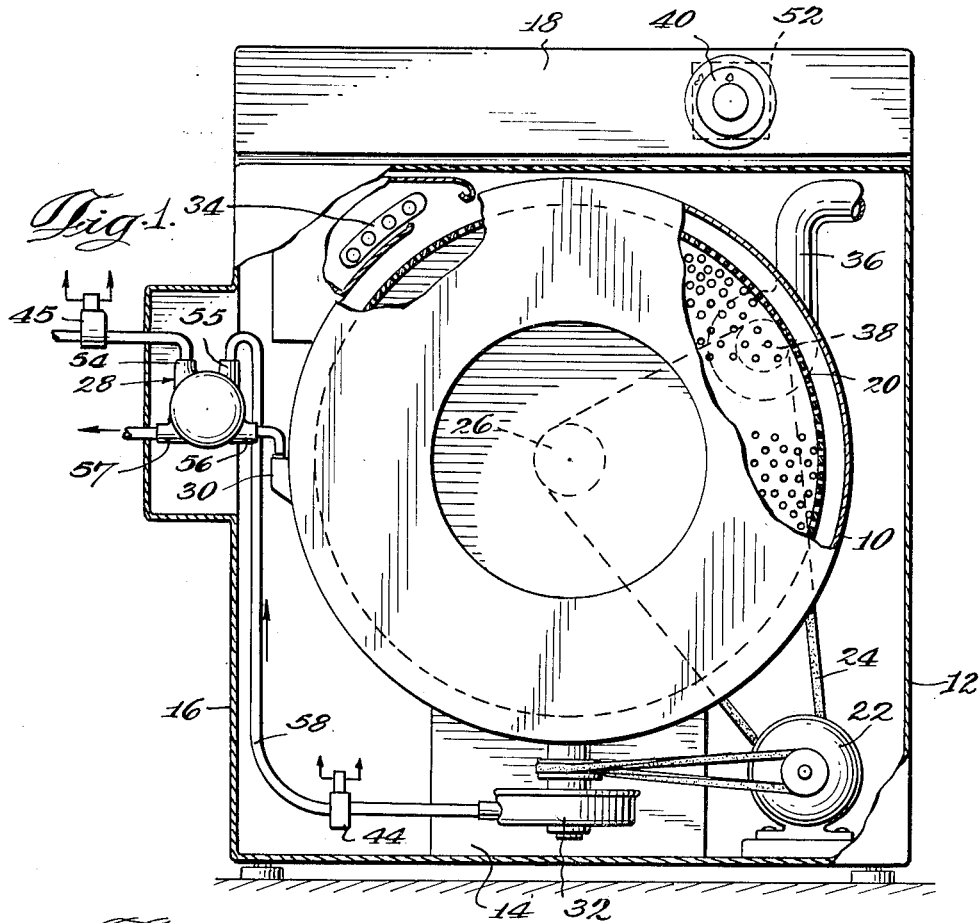
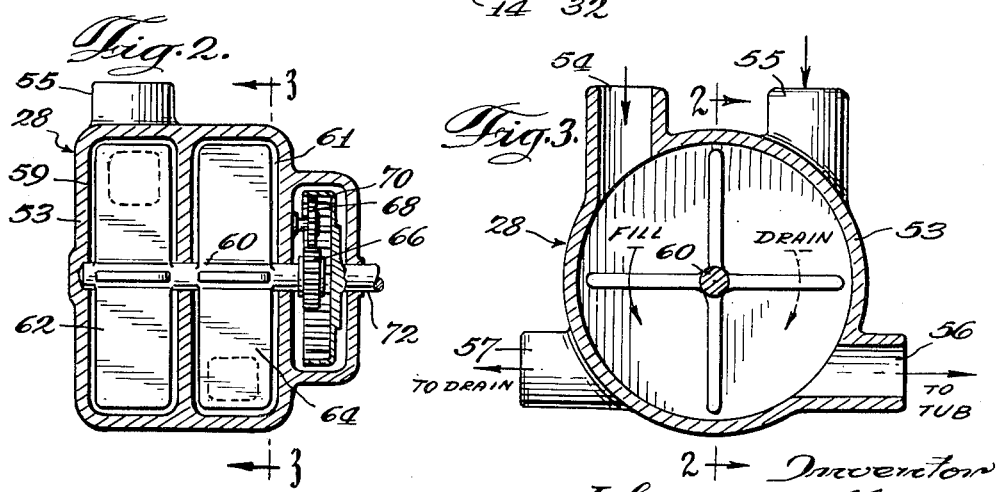
Inventor
John C. Mellinger
By Byron, Hume, Groen & Clement
attorneys

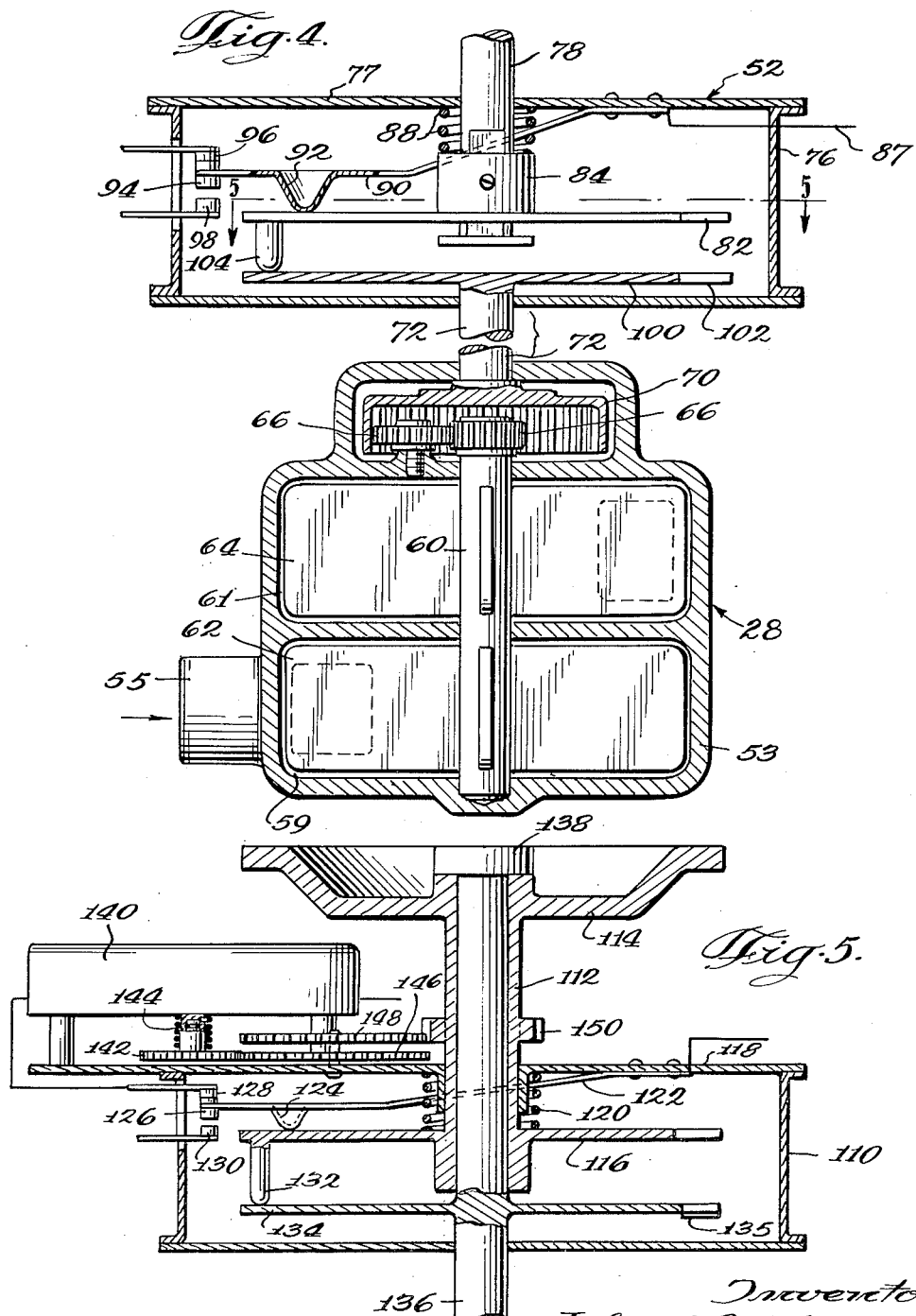

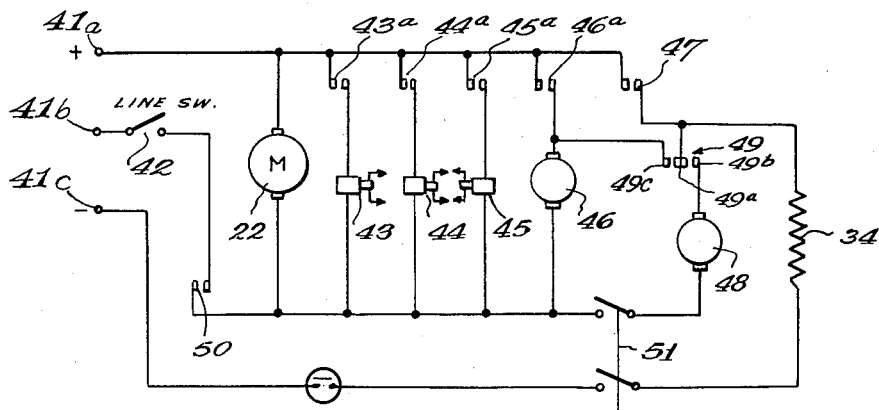
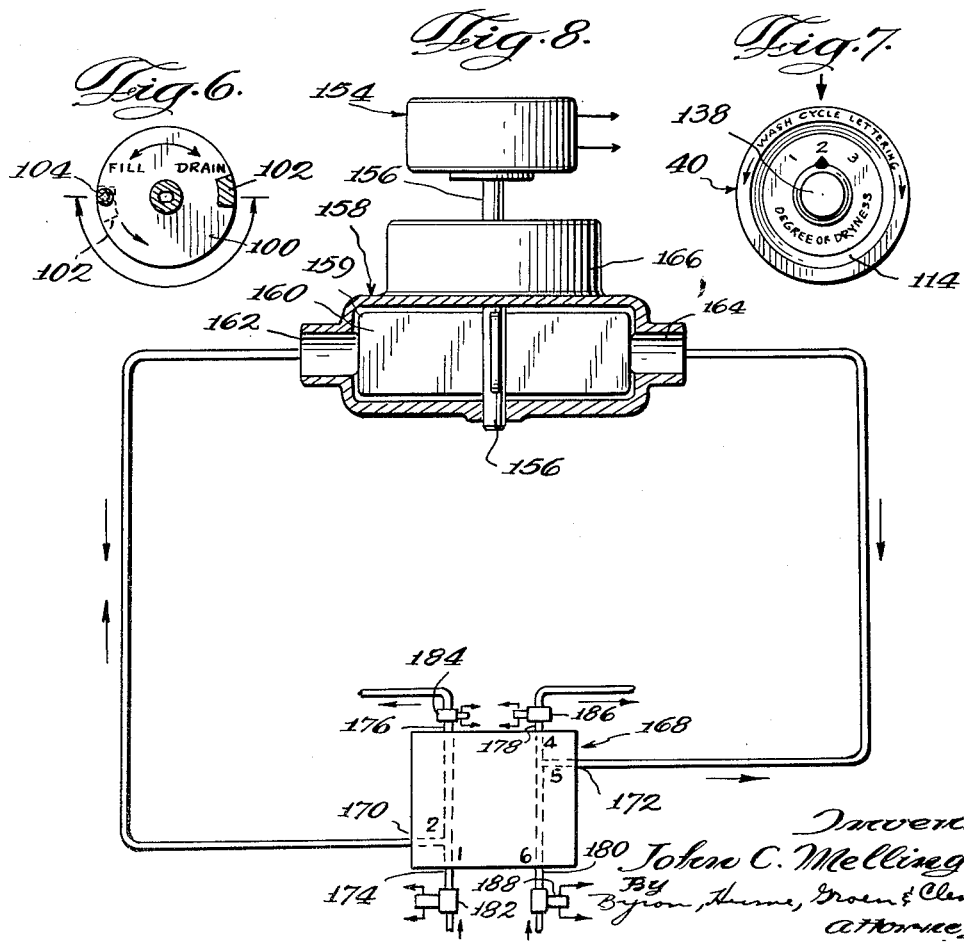

United States Patent Office 3,048,027
Patented Aug. 7, 1962

3,048,027
AUTOMATIC DRY CONTROL FOR COMBINATION WASHER-DRIER
John C. Mellinger, Newton, Iowa, assignor to The Maytag Company, Newton, Iowa, a corporation of Delaware
Filed Sept. 11, 1958, Ser. No. 760,447
10 Claims. (Cl. 68—12)

This invention relates to a programming device and in particular to a programming device especially suited for use with combination washers and driers.

The programming systems for combination washers and driers have been developed to the extent that the machines are substantially fully automatic. By the use of cams, solenoids and various electrical circuitry it is possible to start and stop each phase of the washing and drying cycles in the proper sequence and provide a proper allotted time for each. As a matter of fact, in the more advanced machines the operator merely has to insert the articles to be laundered, actuate the programming switch and finally remove the articles after the drying cycle has been completed. Naturally these machines have experienced tremendous commercial success, at least partially as a result of their labor saving qualities.

It has been found that the amount of water retained in the clothes after the spin cycle differs with the type of fabric. This variation in the amount of retained water results in a variable amount of drying time necessary to bring the clothes to the desired dryness. If, for example, the amount of retained water is greater than usual, then the drying cycle should be correspondingly longer. Conversely, if the retained amount of water is relatively small, then the drying cycle should be correspondingly shorter. Designs of heretofore known combination washers and driers have not made provision for variations in the amount of retained water. As a result, many times the laundered articles are overdried or scorched or underdried due to variation in the amount of retained water. For this reason a foremost feature and object of the invention resides in the provision of means for relating the length of the drying cycle to the amount of retained water in the contents of the washer.

Another object of the invention resides in the provision of a programming device that automatically senses the amount of retained water in the laundered articles and sets the length of drying cycle in accordance therewith.

Another object of the invention resides in the provision of a programming device of the character described hereinbefore that may be used in conjunction with heretofore known conventional programming devices.

Another object of the invention resides in the provision of a programming device adapted to sense the amount of retained water in the laundered articles so as to set the length of the drying cycle in accordance therewith, of a novel construction.

These and other objects of the invention will be apparent upon reading of the specification with reference to the following drawings.

In the drawings:

FIGURE 1 is a front elevation partially broken away showing a washer-drier of the type suitable for use with the invention.

FIGURE 2 is a sectional view of a metering device used in the construction of the invention taken along the lines 2—2 in FIGURE 3.

FIGURE 3 is a sectional view taken along the lines 3—3 in FIGURE 2.

FIGURE 4 is a side view in section of a programming device embodying the invention.

FIGURE 5 is a modification of the timer mechanism shown in FIGURE 4.

FIGURE 6 is a plan view of a cam used in the construction of the timer mechanism shown in FIGURE 4.

FIGURE 7 is a plan view of the dial used in the construction of the timer mechanism shown in FIGURE 5.

FIGURE 8 is a schematic view of a modification of the programming device embodying the invention.

FIGURE 9 is a view of one form of programming circuit suited for operation of the washer-drier shown in FIGURE 1.

Referring now to FIGURE 1, there is shown a diagrammatic illustration of a combination washer-drier especially suitable for use with my invention. To simplify the explanation and understanding of this combination washer-drier in its operation with the invention, the drier portion of this washer-drier is pictured as having an air flow which does not recirculate within the drier chamber but rather receives air from the ambient atmosphere, passes this air over a heating unit prior to its entry into the drying chamber, and then exhausts the hot humid air into the atmosphere through external duct work. As the programming device forming this invention is not dependent upon the precise construction of the machine which it controls, it should be apparent that various types of machines can readily be used with the subject invention as described hereinafter.

In FIGURE 1 the washer-drier is shown as including a casing 10 mounted on a base frame 12 by means of the support members 14. A cabinet member 16 having a control panel 18 is connected to the base frame 12 to completely enclose the entire washer-drier structure. A rotatable drum 20 having perforate side and back walls is mounted on the rear wall of the stationary casing 10, and is driven by the rear pulley (not shown) of the double ended motor 22 through the belt 24 and the transmission 26 carried on the rear wall of the casing 10. A shifting mechanism (not shown) within the transmission 26 regulates the speed of the drum 20 at approximately 50 r.p.m. for tumbling, during the agitation and drying periods, or 200 r.p.m. for spinning during the extraction period.

The water for the washing operations of the washer-drier is supplied through the metering valve 28 which discharges into the casing 10 through the liquid receiving cup 30 formed on the cylindrical side wall of that casing. The washing fluid is discharged from the casing 10 by means of the water pump 32 which is driven by the motor 22. The water pump 32 discharges into the metering valve 28 which in turn is connected to a suitable drain.

The evaporation of moisture from clothing placed within the drum 20 is accomplished by air from the ambient atmosphere into the casing 10 past the heating element 34 and then into the drum 20. The hot moist air is then exhausted from the casing 10 through the rear exhaust opening 36 which is located on the rear wall of the casing 10 and may be provided with the suction fan 38.

The back panel 18 serves as a supporting structure for a sequential controller (not shown) which is connected to the control dial 40. One sequential controller which is particularly adapted for use in the practice of the invention is shown in the co-pending applications Serial 621,681 filed November 13, 1956, and Serial 693,744 filed October 31, 1957, assigned to the same assignee. However, other types of sequential controllers and programming devices may be used in the practice of the invention.

The operation of the washer-drier can be further understood by referring to the circuit diagram shown in FIGURE 9. This particular circuit consists of the conductors 41a, 41b, and 41c, which are connected to a suitable source of 3-phase current, with the flow of electrical energy being controlled by line switch 42. The closing of the switch 42 actuates the motor 22 shown in FIGURE 1. By the use of the sequential control device disclosed in the aforementioned application it is possible to actuate the various components of the circuit in their proper order. The circuit includes a spin solenoid 43 which shifts the motor 22 from 50 r.p.m. to 200 r.p.m. during the spin cycle. The spin solenoid 43 is energized by the closing of the contacts 43a which is brought about by a suitable cam arrangement. A drain solenoid 44 controls the egress of water from the compartment 10 and is energized by the closing of the contacts 44a which are in turn opened and closed by suitable cam arrangements. A fill solenoid 45 controls the ingress of water into the compartment 10 and is likewise energized by the closing of the contacts 45a which are also opened and closed by suitable cam arrangement. The length of the wash cycle is controlled by the wash timer 46 which is actuated by the closing of the contacts 46a. The drying cycle is controlled by contacts 47 and the dry timer 48. The dry timer 48 in turn actuates the heater 34 by means of the contacts 49 as will be described in greater detail later on. The sequential controller may also be provided with an adjustable cam arrangement which actuates the contact members 50 so that each phase of the washing and drying cycles can be varied as desired. This adjustable cam arrangement is substantially the same as that shown in the aforementioned applications. A thermostatic switch 51 is provided for preventing any overheating of the heater element 34. If the switch 51 should open due to overheating of the element 34, it will also de-energize the dry timer 48 so that the latter is operative only when the heater is energized.

The operation of the drier cycle is briefly as follows. After the final spin sequence the wash timer circuit is de-energized by the opening of contacts 46a and the dry timer circuit and heater 34 are energized by the closing of contacts 47. As will be seen later on, the contacts 49a and 49b will have been previously closed by the flow of water to and from the casing 10 so that the dry timer is energized. When the dry sequence has expired, the contacts 49a and 49b will be opened and contacts 49a and 49c closed so that the wash timer 46 circuit is energized. Once the wash timer 46 is re-energized, it will advance until contacts 47 and 50 are opened. When the contacts 50 are opened, the heater 34 is also de-energized.

As is mentioned previously, one of the problems encountered in the washing of clothes and the like is the variable amount of water retained in the laundered articles. The amount varies with different types of fabrics, so that the amount of time required to bring the clothes and the like to a desired dryness is a variable.

Accordingly a principal feature of the invention is to provide a system which automatically measures the amount of retained water in the contents of the drum 20 and then selects a drying cycle of corresponding length to provide the desired degree of dryness. This system includes a metering device 28 which is interconnected to the suitable timer mechanism generally denoted by the numeral 52 and as best shown in FIGURE 4. The two elements are mechanically interconnected and may be positioned remotely from each other as can be seen from FIGURE 1.

Referring now to FIGURE 2, there is shown one form of a metering device which is especially suited for the practice of the invention. The metering device 28 includes the casing 53 which is provided with ports 54, 55, 56, and 57. The port 54 is adapted to be connected to a source of water (not shown) which may consist of hot and cold water taps interconnected through a suitable mixing valve (not shown). The inlet port 54 communicates with the outlet port 56 which discharges into the liquid receiving cup 30 on the casing 10, as will be described more fully hereinafter. The port 55 is connected to the discharge pump 32 by means of the conduit 58 so as to receive the spent wash and rinse water from the casing 10. The port 55 communicates with the port 57 which in turn is connected to a suitable disposal means (not shown).

Referring back to FIGURE 2, it can be seen that the casing 53 is provided with compartments 59 and 61. The compartment 59 receives the flow from the pump 32 through the inlet 55 and out the port 57 to a suitable disposal means. The compartment 61 receives the flow through the inlet port 54 from a suitable source of water and is exhausted through the port 56 into the liquid receiving cup 30. Extending through the casing 53 is the rotatably mounted shaft 60. An impeller 62 is fixably mounted on the shaft 60 in the compartment 59, and a similar impeller 64 is mounted on the shaft 60 in the compartment 61. Each of the impellers 62 and 64 is adapted to be rotated by the liquid received and exhausted through the respective inlet and outlet ports of the compartments 59 and 61.

In FIGURE 3 it can be seen that the liquid received in the port 55 will rotate the impeller 62 in a clockwise direction. On the other hand, the liquid received into compartment 61 from inlet port 54 will rotate the impeller 64 in a counterclockwise direction. The shaft 60 is provided with a sun gear 66 which is drivingly connected to a planetary gear 68 mounted on the wall of the casing 53. The planetary gear 68 is in turn connected to the ring gear 70 which is drivingly connected to the shaft 72. The shaft 72 is in turn connected to the programming device 52 as shown in FIGURE 4 and as will be described more fully hereinafter.

It can now be seen that as the wash water is directed into the casing 10, the shaft 72 is rotated in a counterclockwise direction. On the other hand, as the spent wash and rinse water is directed from the pump 32 into the casing 53, the shaft 72 is rotated in the opposite or clockwise direction.

In the preferred embodiment the gearing should be such that a maximum filling of water in the casing 10 will not rotate the shaft 72 over one complete revolution and preferably somewhat less. The amount of desired rotation of the shaft 72 in any event will depend upon the particular programming device with which the metering device 28 is used.

Referring now to FIGURE 4, there is shown a somewhat simplified schematic illustration of a timer mechanism that is especially suited to be used in the practice of the invention. Other cams for controlling the various preceding phases may be used as needed and as shown in the co-pending applications.

The timer mechanism 52 includes a casing 76 of some suitable type which in this instance is adapted to be mounted on the control panel 18 by the wall 77. Extending through the wall 77 of the casing 76 is a shaft 78 which may be connected to the control knob 40 in some suitable fashion for actuating the programming device. The shaft 78 is also connected to a suitable timer motor or drive means preferably of the type that provides a constant speed rotation of the shaft.

A timer cam 82 is secured by means of the hub 84 to the shaft 78 by means of a set screw or some similar key device. The cam 82 is maintained in a spaced relationship from the wall 77 of the casing 76 by means of the spring 88.

A spring arm 90 is secured at one end to the wall 77 and is connected to the lead 87 from a suitable source of electrical energy, as best shown in FIGURE 4. The spring arm is provided with the lug 92 which rests on the upper surface of the timer cam 82. In the preferred embodiment the spring arm 90 is provided with sufficient bias so that when mounted as shown in FIGURE 4, it is constantly urging the timer cam 82 in a downward direction. At the outermost end of the arm 90 is a contact 94 which is adapted to be brought into engagement with the contact 96 or the contact 98. The contacts 94, 96, and 98 correspond to the contacts 49a, 49b and 49c, respectively. The contact 96 is connected to the dry timer motor (not shown) and the contact 98 to the wash timer 46.

As shown in FIGURE 4, when the timer cam 82 is in its uppermost position, the contact 94 is in engagement with the contact 96 so as to close the circuit. When in this particular position the dry timer motor (not shown) connected to the shaft 78 is energized along with the heating element 34 as shown in FIGURE 9. When the contact 94 is in engagement with the contact 98, the dry timer is de-energized with the wash timer 46 being energized. The timer cam 82 co-operates with the meter cam 100 which is secured to the shaft 72. The meter cam 100 is provided with a detent 102 adjacent its periphery which is adapted to receive a detent pin 104 mounted on the timer cam 82. The timer cam 82 is rotated is a counterclockwise direction by the timer motor until the detent pin 104 is received in the detent 102. When this happens, the contact 94 is moved out of engagement with the contact 96 so that the dry timer motor is de-energized.

As was mentioned previously, the shaft 72 is rotated in the counterclockwise direction by the filling of the casing 10 and in a clockwise direction by the spent wash water from the pump 32. This means that the meter cam is rotated in a like direction by the metering device 28. Thus, when the casing 10 is being filled, the detent 102 is rotated away from the detent pin 104. Conversely, when the casing 10 is being emptied or drained, the metering cam 100 and the detent 102 is rotated toward the detent pin in the opposite direction. However, since there will always be some water retained in the casing, the return toward the detent pin 104 will be somewhat less than the original rotation in the opposite direction.

Referring now to FIGURE 5, there is shown a modification of the timer mechanism shown in FIGURE 4. This modification is adapted to provide varying degrees of dryness for the contents of the washer-drier. The modification includes a casing 110, which is adapted to be mounted on the control panel 18 of the washer-drier. A rotatable sleeve 112 extends through the casing 110 and is provided with an indicator knob 114. The rotatable sleeve 112 is connected to the timer cam 116 and provides means for setting the same by rotation of the indicator knob 114. It should be pointed out that the modification shown in FIGURE 5, like the modification shown in FIGURE 4, is adapted to be used with various programming cams of the type shown in the aforementioned co-pending applications in order to completely control the washing and drying cycles. However, for purposes of clarification, the modification in FIGURE 5 will be shown only as applied to the dry cycle and with those elements necessary for controlling the dry cycle. The timer cam is held in spaced relationship from the wall 118 of the casing 110 by means of the coil spring 120 in the manner previously described. A spring arm 122 is secured to the wall 118 at one end and is adapted to ride on the timer cam 116 by means of the lug 124. The outer end of the spring arm 122 is provided with the contact 126 operatively associated with the contacts 128 and 130, as described with reference to FIGURE 4. The timer cam 116 is provided with a pin 132 which rides on the meter cam 134 which is connected by means of shaft 136 to the metering device 28. The shaft 136 extends upwardly through the rotatable sleeve 112 and is provided with a knob 138, as shown in FIGURE 6. By rotating the knob 138 it is possible to further position the detent 135 of the meter cam 134 with respect to the pin 132. In this manner it is possible to vary the degree of dryness of the articles to be laundered. In order to facilitate this operation the indicia indicating the degree of dryness is shown on the knob 114. As a result of this arrangement, the detent 135 is positioned with respect to the detent pin 132 by means of the metering device 28 and the knob 138.

The timer mechanism is provided with the timer motor 140 which is mounted on the wall 118. The timer motor 140 drives the gear 142 by means of a suitable clutch 144. The gear 142 drives the sleeve 112 by means of the gears 146, 148, and 150, which in turn drives the cam 116. When the pin 132 reaches the detent 135, the motor 140 is de-energized in the manner previously described.

Referring now to FIGURE 8, there is shown another modification of the invention. This modification is shown in schematic form, particularly the timer mechanism which is indicated generally by the numeral 154. The timer mechanism 154 may be of any suitable type such as those shown in FIGURES 4 and 5, and is connected to a metering device 158 by the shaft 156. The metering device 158 consists of a single compartment 159 having the impeller 160 therein. The compartment 159 is provided with the ports 162 and 164. The impeller 160 is connected to the shaft 156 by the gearing generally denoted by the numeral 166. The metering device in turn is connected to a control valve 168 by means of the ports 170 and 172. The control valve 168 is also connected to a suitable source of water and to a drain by means of the ports 174 and 176, respectively. The control valve 168 is further connected to the casing 10 by means of the port 178 and to the tub drain by means of the port 180. Thus, when it is desired to fill the casing 10, the water flows into the port 174 and out the port 170 through the metering valve 158. The water is then returned to the control valve into port 172 and out port 178 to the casing 10. On the other hand, if it is desired to drain water from the casing 10, the spent water flows in the port 180 and out port 172 to the metering valve 158. After flowing through the metering valve, the spent water is then returned to the control valve 168 to port 170 and out port 176 to the drain. The control valve 168 is provided with the solenoid valves 182, 184, 186, and 188, which are associated with ports 174, 176, 178, and 180, respectively. The solenoids 182–188 are connected to the various programming cams shown in the aforementioned co-pending applications. For example, solenoids 182 and 186 would be connected to the fill cam of these programming devices. In this manner, when the fill cam is in the actuating position, the solenoids 182 and 186 would be open so that water could be received from the source and allowed to flow into the casing 10. When the fill cycle is complete, the solenoids 182 and 186 would then be closed so that there would be no further flow into the casing 10 at that time. Similarly, the drain cam could be used to actuate the solenoids 188 and 184 so as to permit the flow from the casing 10 into the drain.

It can now be seen that the subect invention as described herein measures the ingress of water into the casing 10 and the egress of water as it is drained from the casing, so that the amount of water retained in the casing is the difference between the input and the output. Assuming the pin and the detent to be in line at the start of the cycle, the addition and removal of water to and from the tub during the washing, rinsing, and extraction periods of the wash cycle will cause a presetting of the metering cam and detent as explained previously. Since the metering cam is rotated at a substantially constant velocity by the timer motor, the length of the drying cycle is preset in accordance with the amount of water retained in the casing. In this manner, it is possible to dry the laundered articles to a consistent degree of dryness, regardless of the amount of retained water.

Although specific embodiments of the invention have been disclosed herein, it is to be understood that these are merely by way of example and in no manner are to be construed as limitations. It is contemplated that certain modifications may be made within the scope of the claims without departing from the spirit of the invention.

What is claimed is:

1. In a combination washer and drier having a compartment for washing and drying having means for permitting the ingress and the egress of water, the combination comprising drying means associated with the compartment for purposes of drying the contents therein, means for energizing and de-energizing said drying means, and timer means adapted to be set for drying cycles of variable predetermined lengths, and metering means for measuring the ingress and egress of water, said metering means connected to said timer means for setting the same in accordance with the quantity of water retained in the compartment.

2. In a combination washer and drier having a compartment for washing and drying having means for permitting the ingress and the egress of water, the combination comprising heating means associated with the compartment for purposes of drying the contents therein, switch means for connecting and disconnecting said heating means with and from a source of electrical energy, cam means for opening and closing said switch means, a timer means for actuating said cam means at a predetermined time to open said switch means to disconnect said heating means, and metering means for measuring the ingress and egress of water, said metering means connected to said timer means for setting the same in accordance with the quantity of water retained in the compartment.

3. In a combination washer and drier having a compartment for washing and drying having means for permitting the ingress and the egress of water, the combination comprising heating means associated with the compartment for purposes of drying the contents therein, switch means for connecting and disconnecting said heating means with and from a source of electrical energy, cam means for opening and closing said switch means, a timer means for actuating said cam means at a predetermined time to open said switch means to disconnect said heating means, a first metering device for measuring the ingress of water into the compartment, a second metering device for measuring the egress of water from said compartment, said first and second metering devices connected to said timer means for setting the same to provide a drying cycle in accordance with the amount of water retained in the compartment.

4. In a combination washer and drier having a compartment for washing and drying having means for permitting the ingress and the egress of water, the combination comprising heating means associated with the compartment for purposes of drying the contents therein, switch means for connecting and disconnecting said heating means with and from a source of electrical energy, timer means for controlling the opening of said switch means to disconnect said heating means, said timer means adapted to be set for drying cycles of variable predetermined lengths, a first metering device for measuring the ingress of water into the compartment, a second metering device for measuring the egress of water from said compartment, and said first and second metering devices connected to said timer means for setting the same to provide a drying cycle in accordance with the amount of water retained in the compartment.

5. In a combination washer and drier having a compartment for washing and drying having means for permitting the ingress and the egress of water, the combination comprising heating means associated with the compartment for purposes of drying the contents therein, switch means for connecting and disconnecting said heating means with and from a source of electrical energy, timer means for controlling the opening of said switch means to disconnect said heating means, said timer means adapted to be set for drying cycles of variable predetermined lengths, a first metering device for measuring the ingress of water into the compartment, a second metering device for measuring the egress of water from said compartment, said first and second metering devices connected to said timer means for setting the same to provide a drying cycle in accordance with the amount of water retained in the compartment, and means for adjusting said timer means to vary the length of the drying cycle.

6. A programming device especially suited for use with combination washers and driers having a compartment for the washing and drying comprising, drying means associated with the compartment for purposes of drying the contents therein, means for energizing and de-energizing said drying means, timer means for opening said last named means after a predetermined period, said timer means adapted to be set for drying cycles of variable predetermined lengths, metering means for measuring the ingress and egress of water, said metering means connected to said timer means for setting the same in accordance with the quantity of water retained in the compartment.

7. A programming device especially suited for use with combination washers and driers having a compartment for the washing and drying comprising heating means associated with the compartment for purposes of drying the contents therein, switch means for connecting and disconnecting said heating means with and from a source of electrical energy, timer means for controlling the opening of said switch means after the lapse of a predetermined drying time, said timer means adapted to be set for drying cycles of variable predetermined lengths, a first metering device for measuring the ingress of water into the compartment, a second metering device for measuring the egress of water from said compartment, said first and second metering devices connected to said timer means for setting the same to provide a drying cycle in accordance with the amount of water retained in the compartment, and means for adjusting said timer means to vary the length of the drying cycle.

8. In a laundering apparatus, the combination comprising a timer means for controlling the length of the drying period, means for measuring the ingress of water into the apparatus, means for measuring the egress of water from the apparatus, and means for setting said timer means to actuate the drying means for a period proportionate with the difference between the ingress and the egress.

9. In a laundering apparatus for the wasing and drying of clothes, the combination comprising a control means for controlling the length of the drying period, means for measuring the ingress of water into the apparatus, means for measuring the egress of water from the apparatus, and means for controlling the operation of said control means commensurate with the difference in quantities between the ingress and egress.

10. In a combination washer and dryer having a compartment for washing and drying having means for permitting the ingress and egress of water, the combination comprising drying means associated with said compartment for purposes of drying the contents therein, means for measuring the ingress of water into said compartment, means for measuring the egress of water from said compartment, control means for controlling said drying means, and means for actuating said control means and in turn said drying means for a period commensurate with the difference in quantities of water between the ingress and egress.

References Cited in the file of this patent

UNITED STATES PATENTS

| 2,321,641 | Andersen | June 15, 1943 |
| 2,656,695 | Miller | Oct. 27, 1953 |
| 2,824,385 | Toma | Feb. 25, 1958 |

FOREIGN PATENTS

| 696,236 | Great Britain | Aug. 26, 1953 |